United States Patent

Osawa

[11] Patent Number: 5,544,954
[45] Date of Patent: Aug. 13, 1996

[54] BALL RETAINERS IN A LINEAR GUIDE APPARATUS

[75] Inventor: Nobuyuki Osawa, Gunma, Japan

[73] Assignee: NSK Ltd., Tokyo, Japan

[21] Appl. No.: 532,499

[22] Filed: Sep. 22, 1995

[30] Foreign Application Priority Data

Sep. 22, 1994 [JP] Japan .................................. 6-228125

[51] Int. Cl.⁶ ...................................................... F16C 29/06
[52] U.S. Cl. .................................................................. 384/45
[58] Field of Search ................................ 384/45, 44, 43

[56] References Cited

U.S. PATENT DOCUMENTS

| | | | |
|---|---|---|---|
| 4,390,215 | 6/1983 | Mottate | 384/45 |
| 4,441,765 | 4/1984 | Kasai et al. | 384/45 |
| 4,472,003 | 9/1984 | Osawa | 384/45 |
| 4,557,530 | 12/1985 | Hasse | 384/45 |
| 4,810,104 | 3/1989 | Matsuoka et al. | 384/45 |

FOREIGN PATENT DOCUMENTS 62-8427  2/1987  Japan .
63-26577 7/1988. Japan .

*Primary Examiner*—Thomas R. Hannon
*Attorney, Agent, or Firm*—Sughrue, Mion, Zinn, Macpeak & Seas

[57] ABSTRACT

In a linear guide apparatus provided with a guide rail, a slider, an end cap, a plurality of balls and a ball retainer, the end cap includes a half-ring-shaped curved path in the inner surface and an outer peripheral groove, in the outer surface, which is curved in correspondence to the curved path, the outer peripheral groove having a side wall and protrusions which extend from the side wall so as to decrease the width of the outer peripheral groove, the ball retainer being secured to the slider with a locking part of the ball retainer which is engaged with the outer peripheral groove while being held between the protrusions. The ball retainer is so improved that it can be readily secured to the slider of the linear guide apparatus without interfering with other components, and readily so absorbs a dimensional difference relative to the slider that it prevents the rolling balls from falling away from the slider.

5 Claims, 6 Drawing Sheets

BALL RETAINERS IN A LINEAR GUIDE APPARATUS

BACKGROUND OF THE INVENTION

The present invention relates to a relatively small linear guide apparatus provided for hydraulic equipment, pneumatic equipment, facilities for manufacturing electronic parts such as semiconductor devices, computer's peripheral equipment, measurings equipment and the like, and more particular to an improvement of ball retainers in the linear guide apparatus.

A linear guide apparatus of this type, as shown in FIGS. 8 and 9, provides: a guide rail 101 elongated in the axial direction; and a slider 102 (also called "bearing") slidably mounted on the guide rail 101. The slider 102 linearly slides in the axial direction relative to the guide rail 101 while being guided by the guide rail 101. Both side surfaces of the guide rail 101 have each at least one ball rolling groove 103 of a half circular cross-section. Each of the ball rolling grooves 103 has a thin escaping groove 111 in the bottom.

The slider 102 is mounted on the guide rail 101 in such a manner that it hangs over the slider 102. That is, the slider 102 is inverted-U-shaped in section, having right and left wings. Each of the right and left wings has in its inner surface a ball rolling groove 104 which is confronted with the ball rolling groove 103 of the guide rail 101, and a ball returning path 105 which is formed of a through hole extending in the axial direction in the wing in such a manner that the through hole is in parallel with the ball rolling groove 104. In addition, the slider 102 has a pair of end caps 102B which are mounted at both axial ends. Each of the end caps 102B has a pair of curved paths 106 which are formed in half ring shapes, in such a manner that they are communicated with the ball returning path 105 and the ball rolling groove 104.

The ball rolling grooves 103 of the guide rail 101, and the ball rolling grooves 104 of the slider 102 form a pair of loaded-ball rolling paths 107. The loaded-ball rolling paths 107, the curved paths 106 in the right and left wings, and the ball returning paths 105 form a pair of endless ball circulating paths 108. A number of rolling balls 109 are fitted in the endless ball circulating paths 108. Hence, as the slider is moved relative to the guide rail 101, those balls 109 are infinitely circulated while being rolled.

The linear guide apparatus is assembled as follows: First the rolling balls are installed in the endless ball circulating paths of the slider 102, and then the slider 102 is mounted on the guide rail 101. Before the slider 102 is coupled to the guide rail 101, it is necessary to prevent the rolling balls from falling away from the ball rolling grooves of the slider 102. For this purpose, ball retainers 110 are engaged with the slider 102 to hold the balls 109 in the ball rolling grooves 104. When the slider 102 is coupled to the guide rail 101 with the balls 109 held by the ball retainers 110, the ball retainers 110 are received in the escaping grooves 111 formed in the bottoms of the ball rolling grooves 103, thus not obstructing the rolling of the balls 109.

Examples of the above-described conventional ball retainer have been disclosed, for instance, by Examined Japanese Utility Patent Publication Nos. Sho. 62-8427 and Sho. 63-26577 (hereinafter referred to as "a first conventional retainer" and "a second conventional retainer", respectively, when applicable).

In the first conventional retainer, the ball retainer 110, as shown in FIG. 9, provides: a linear part 112 which is received by the escaping groove 111 formed in the bottom of the ball rolling groove 103 of the guide rail 101; and a pair of semi-circularly curved parts 113 extending from both ends of the linear part 112. The ball retainer 110 is fitted in the slider 102 so that the pair of semi-circularly curved parts 113 are engaged with recess grooves 116 formed in the inner walls of the half-ring-shaped curved paths 106.

In the second conventional retainer, the ball retainer 120 is of a type as shown in FIG. 10. That is, it is made of a wire material rectangular in section. More specifically, the wire material is such that, in its section, the height is larger than the width. The ball retainer 120 is substantially U-shaped, providing: a linear part 121 which is fitted in the escaping groove formed in the bottom of the ball rolling groove; a pair of bent parts 122 which are extended from both ends of the linear part 121 and bent at right angles in the same direction; and a pair of hooked parts 123 which are extended from both ends of the bent parts 122 and inwardly bent towards each other. The ball retainer 120 is coupled to the slider as follows: That is, it is engaged with mounting holes formed in the end caps by utilizing the elastic forces of the bent parts 122 and the hooked parts 123.

In the above-described first conventional retainer, the length of the linear part 112 of the ball retainer 110 and the axial length of the slider body 102A are unavoidably different from each other. In order to absorb this difference, the recess grooves 116 formed in the inner walls of the half-ring-shaped curved paths 106 of the end caps 102B in which the recess grooves 116 engage the curved parts 113 of the ball retainer 110, are made slightly larger in radius than the curved parts 113 of the ball retainer 110, so that small clearances are formed between the ball retainer and the thin grooves 116. Hence, the ball retainers fitted in the slider are liable to vibrate. In the case of a small linear guide apparatus, this vibration may result in difficulties that the rolling balls fall away from the ball rolling grooves, and the ball retainers interfere with the guide rail.

In the second conventional retainer, the wire material is peculiar rectangular in section; that is, it is not an ordinary wire material. Hence, it is difficult to obtain the wire material, and it is also difficult to accurately form the ball retainer 120 with the wire material. On the other hand, in the case where the length of the slider body is not equal to the length of the linear part 121 of the ball retainer 120, the hooked parts 123 are not smoothly engaged with the mounting holes formed in the end caps. Further, in order to prevent the ball retainer 120 from falling away from the slider, the ball retainers 120 must be retained with side seals attached to the end caps.

SUMMARY OF THE INVENTION

The present invention aims at eliminating the above-described difficulties accompanying conventional ball retainers in a linear guide apparatus.

An object of the present invention is to provide a ball retainer for a linear guide apparatus which is so improved that it can be readily secured not only to the slider of an ordinary linear guide apparatus but also the slider of a small linear guide apparatus without interfering with other components, and it prevents the rolling balls from falling away from the slider, and readily absorbs a dimensional difference relative to the slider, and that it can be manufactured at low cost.

In order to achieve the foregoing object and other objects of the present invention, there is provided a linear guide apparatus with: a guide rail including a first ball rolling groove which extends axially in a side surface of the guide rail, the first ball rolling groove having in its bottom an escaping groove which extends axially; a slider mounted over the guide rail, the slider being axially movable with respect to the guide rail, and including in an inner surface of the slider a second ball rolling groove which confronts the first ball rolling groove, a ball returning path which has a through hole in a wing of the slider, the through hole extending in parallel with the second ball rolling groove, and an end cap joined to an end face of the slider, the end cap including in its inner junction surface a half-ring-shaped curved path which communicates the ball returning path with the second ball rolling groove, the first ball rolling groove and the second ball rolling groove forming a loaded-ball rolling path which form an endless ball rolling path with the ball returning path and the curved path; a plurality of balls installed in the endless ball rolling path; and a ball retainer secured to the slider to prevent the balls from falling away from the slider, the ball retainer being made of a wire material which is formed in a circular shape in section, and including a linear part fitted in the escaping groove, and a locking part which extends from an end of the linear part and is curved arcuately, in which the end cap includes in its outer surface an outer peripheral groove which is curved in correspondence to the curved path, the outer peripheral groove having a side wall and protrusions which extends from the side wall so as to decrease the width of the outer peripheral groove, the ball retainer being secured to the slider with the locking part engaged with the outer peripheral groove while being held between the protrusions.

Since the ball retainers are designed as described above, side seals can be mounted on end portions of the end caps after the ball retainers are secured to the slider so that the locking parts are engaged with the outer peripheral grooves formed in the outer surfaces of the end caps.

The ball retainers of the present invention are each made of the wire material circular in section. Hence, in securing the ball retainers to the slider, it is unnecessary to take its directivity into consideration. This means that the ball retainer can be handled with ease.

In addition, the right and left locking parts of the ball retainer, being curved arcuately, readily follows the outer peripheral grooves of the end caps, thus absorbing the dimensional difference between them.

Each of the outer peripheral grooves of the end caps has one pair of protrusions which are extended from the side walls of the groove towards each other to decrease the groove width. The ball retainers are secured to the slider with their locking parts engaged with the outer peripheral grooves thus designed. Hence, the ball retainers are so restrained in all directions as to be prevented from falling away, thus being scarcely disengaged from the slider. However, the ball retainers can be readily secured to the slider with high accuracy.

Hence, before the side seals are attached to the end caps, the rolling balls can be installed in the slider, and the slider can be tested for operating condition, and other work essential for manufacturing a linear guide apparatus can be achieved with high efficiency.

DETAILED DESCRIPTION OF THE INVENTION

Figure 1:
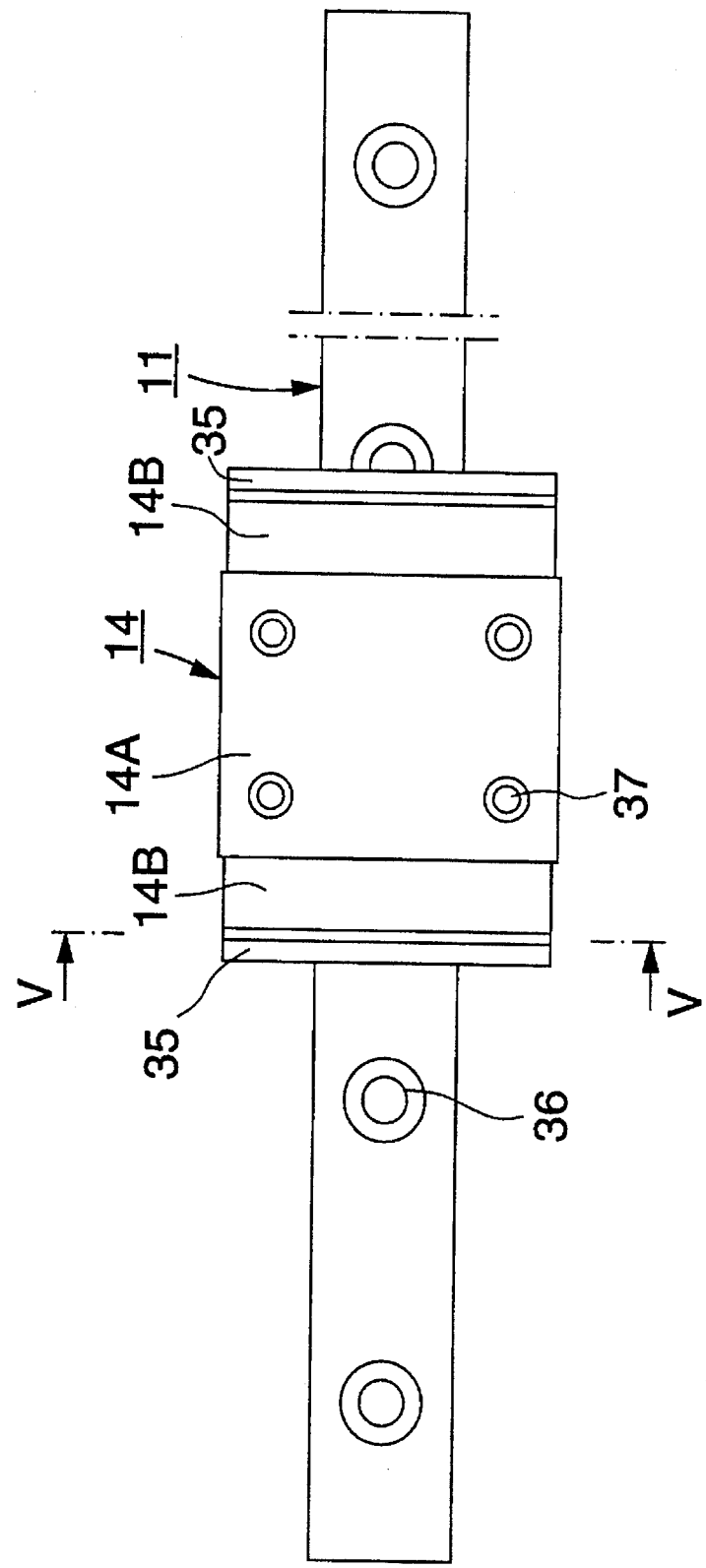
FIGS. 1 and 2 are a plan view and a side view, respectively, showing a linear guide apparatus having ball retainers according to the present invention.
Figure 2:
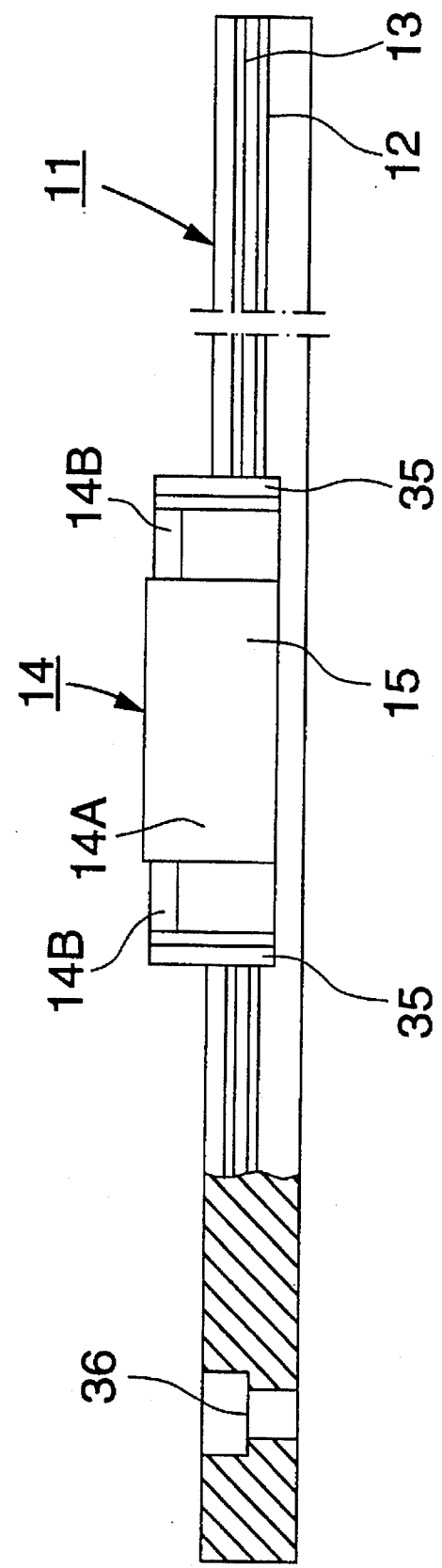

The present invention will be described with reference to its preferred embodiment shown in FIGS. 1 through 7.

A small linear guide apparatus provides a guide rail 11 and a slider 14. The guide rail 11 is formed in a bar rectangular shape in section. The guide rail 1t has a pair of ball rolling grooves 12 of a substantially half circular cross section in both side surfaces thereof in such a manner that the grooves 12 are symmetrical with each other being extended axially, and escaping grooves 13 formed all over in the bottoms of those ball rolling grooves 12. The escaping grooves 13 are smaller in width than the ball rolling grooves 12.

The slider 14 is substantially inverted-U-shaped in cross section, having a pair of wings 15. The wings 15 have ball rolling grooves 16 in the inner surfaces, respectively, which are confronted with the ball rolling grooves 12 of the guide rail 11, respectively. The slider 14 is mounted on the guide rail 11 in such a manner that the slider 14 hangs over the guide rail 11, and is axially movable with respect to the guide rail 11. The slider 14 provides a slider body 14A and a pair of end caps 14B joined to the front and rear ends of the slider body 14A. Each of the wings 15 of the slider body 14A has the aforementioned ball rolling groove 16 in the 15 inner surface, and a ball returning path 17 which is formed of a through hole in the wing 15 in such a manner that the through hole extends in parallel with the ball rolling groove 16.

Each of the end caps 14B has an inner surface 14Bb which is joined to the slider body 14A. Formed in the inner surface are a pair of half-ring-shaped curved path 18 through which the ball rolling grooves 16 and the ball returning paths 17 are communicated with each other, and a pair of ball scooping protrusions 19 each of which is extended from the opening of the curved path 18 to scoop up the balls. On the other hand, formed in the outer surface 14Ba of each of the end caps 14 are a pair of outer peripheral grooves 22 each of which, having an outwardly curved bottom 21 in correspondence to the curved path 18 in the inner surface 14Bb, is gradually deeper towards both sides. A pair of protrusions 23 (retainer clamping protrusions) are extended opposed to each other from both side walls of each of the outer peripheral grooves 22 to slightly decrease the groove width 22w (see FIGS. 6 and 7).

The ball rolling grooves 12 of the guide rail 11, and the opposing ball rolling grooves 16 of the slider body 14A form a pair of loaded-ball rolling paths 24. The loaded ball rolling paths 24, the above-described ball returning paths 17, and the curved paths 18 form a pair of endless ball circulating paths. That is, the endless ball circulating paths are formed on both sides of the guide rail 11, respectively, in such a manner that they are axially symmetrical with each other. A plurality of rolling balls 25 are installed in each of the endless ball circulating paths thus formed. In this case, it is necessary to prevent the balls 25 from falling away from the ball rolling grooves 16 before the slider 14 together with the balls is assembled to the guide rail 11. For this purpose, according to the present invention, the balls 25 are held by ball retainers 30 fitted to the slider 14.

Figure 3:
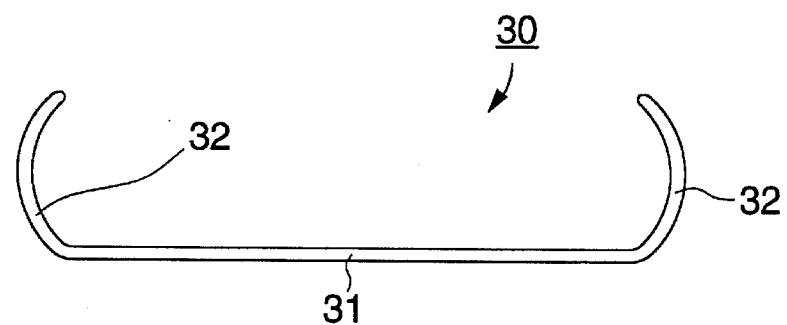
FIGS. 3 and 4 are a plan view and a side view, respectively, showing the ball retainer according to the present invention.
Figure 4:
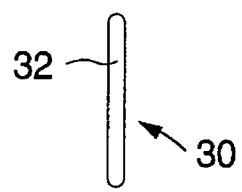
Figure 5:
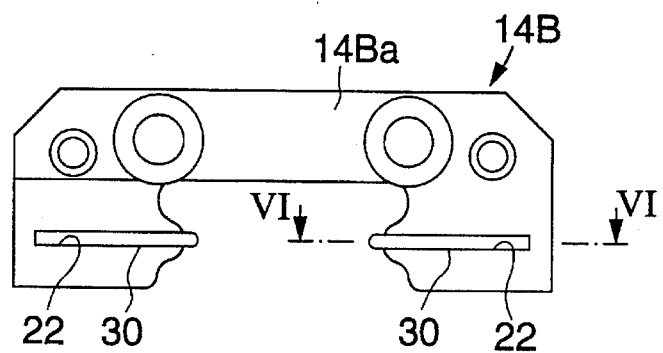
FIG. 5 is a front view of an end cap taken along line V—V in FIG. 1 for a description of a ball retainer mounting structure.

The ball retainers 30 are formed by molding a metal wire which is circularly shaped in section, as shown in FIGS. 3 and 4. Each of the ball retainers 30 provides: a linear part 31 which is fitted in the escaping groove 13 formed in the bottom of the ball rolling groove 12 of the guide rail 11; and a pair of locking parts 32 which are extended from both ends of the linear part 31 and curved arcuately.

In order to secure the ball retainers 30, the aforementioned outer peripheral grooves 22 are formed acting as retainer mounting grooves in the outer surfaces 14Ba of the end caps 14B with which the locking parts 32 of the ball retainers 30 are engaged.

In FIG. 1, side seals 35 are attached to the outer surfaces 14Ba of the end caps 14B. Mounting bolt holes 36 are formed in the guide rail 11. Mounting bolt holes 37 are formed in the upper surface of the slider 14 to mount a table or the like on the slider 14.

Next, there will be described the operation of the present invention.

Figure 6:
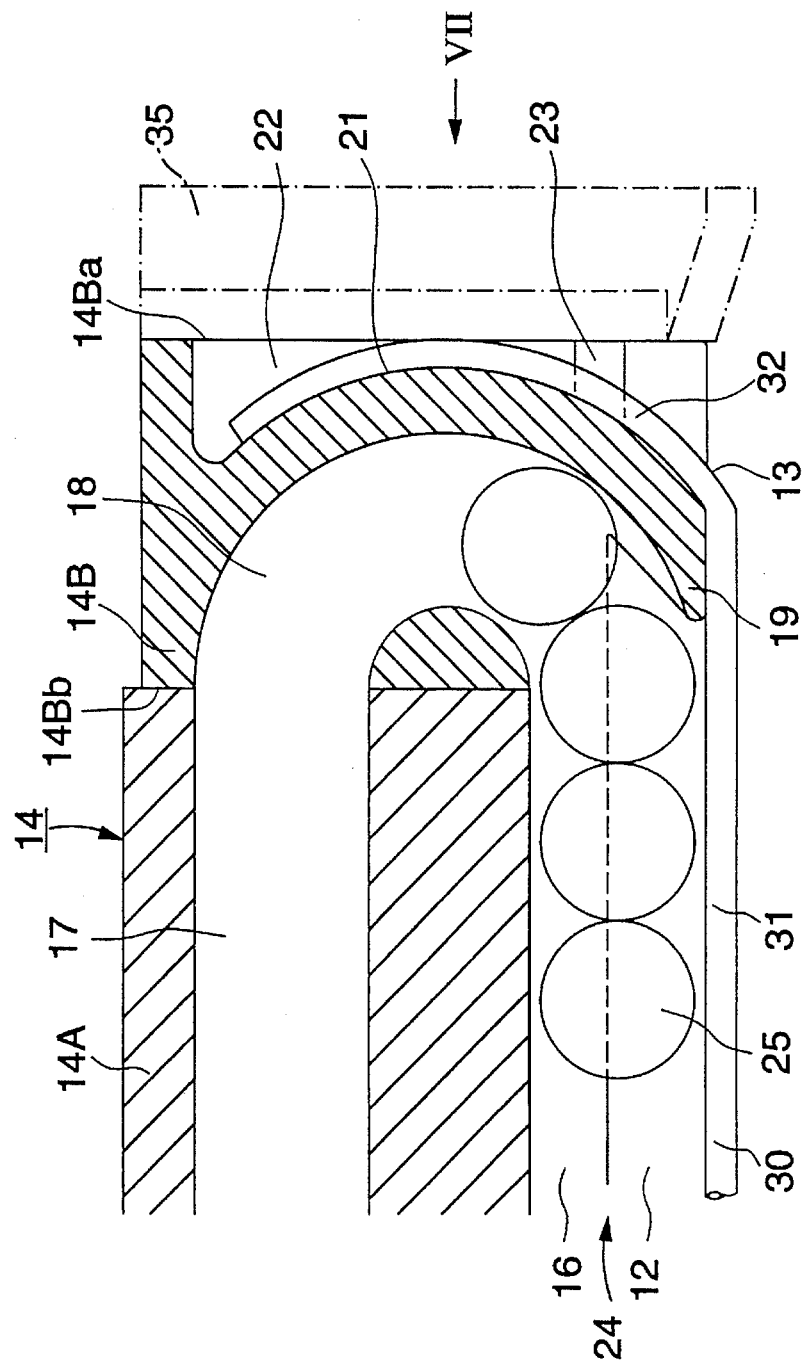
FIG. 6 is a sectional view taken along line VI—VI in FIG. 5, respectively, for a description of the ball retainer mounting structure of the end cap.
Figure 7:
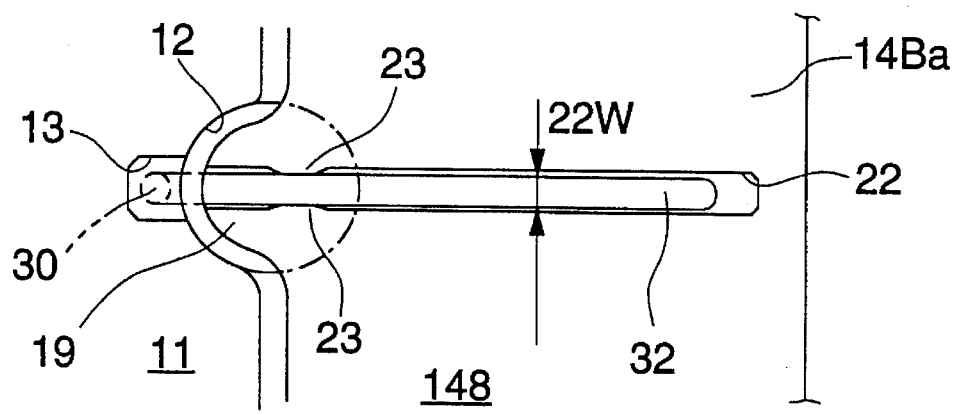
FIG. 7 is a fragmentary side view of the end cap and its relevant components as viewed in the direction of the arrow VII in FIG. 6, for a description of the ball retainer mounting structure.
Figure 8:
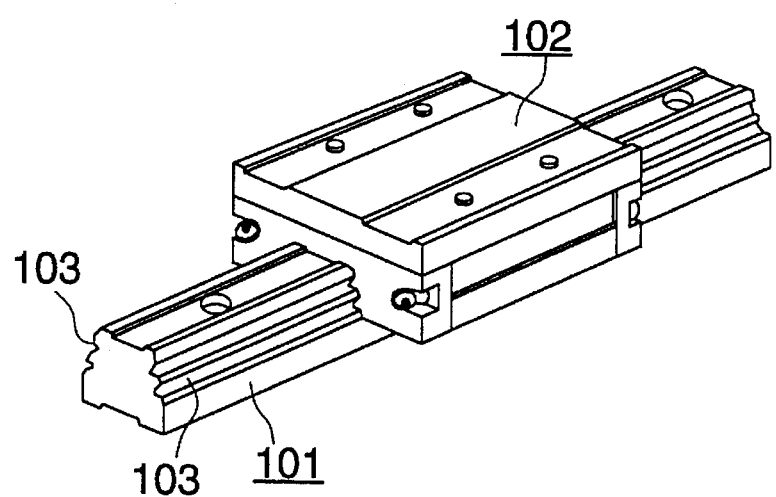
FIG. 8 is a perspective view showing an example of a conventional linear guide apparatus.
Figure 9:
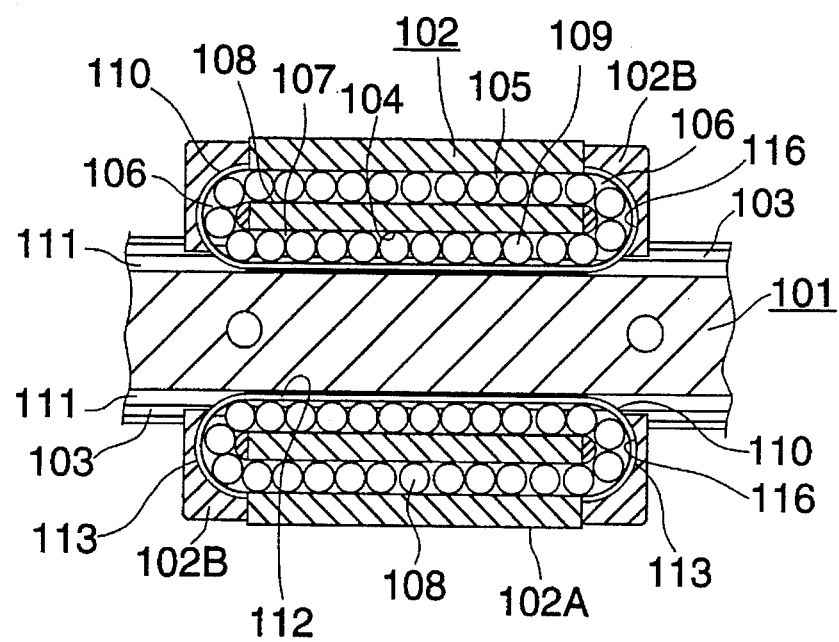
FIG. 9 is a sectional view showing a pair of ball circulating paths provided with conventional ball retainers in the linear guide apparatus shown in FIG. 8.
Figure 10:
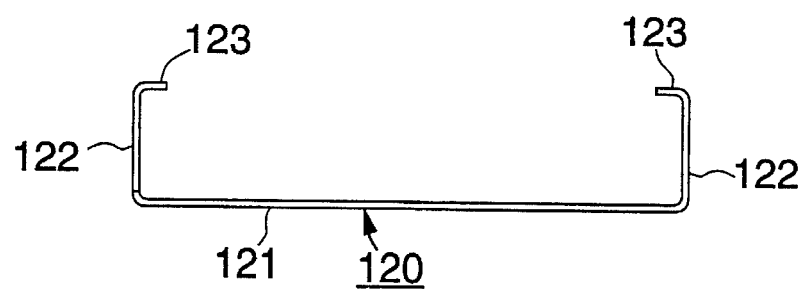
FIG. 10 is a plan view showing another example of the conventional ball retainer.

The end caps 14B are joined to the end faces of the slider body 14A with the bolts, respectively. Each of the ball retainer 30, as shown in FIG. 6, is secured by engaging its locking parts 32 with the outer peripheral grooves 22 formed in the outer surfaces 14Ba of the end caps 14B. In this operation, each of the locking parts 32 is pushed in the narrow space between the protrusions (or retainer clamping protrusions) 23 which are protruded inwardly from the side walls of the outer peripheral groove 22 toward each other, so that it is positively held in the groove 22. Therefore, the locking part 32 is prevented from moving not only in the directions of length and width of the slider but also in the vertical direction. That is, the locking part 32 is positively prevented from falling away from the end cap 14B.

In the ball retainer 30, the locking parts 32 are arcuately curved; that is, the linear part 31 merges smoothly with the locking parts 32. Hence, even in the case where the length of the linear part 31 of the ball retainer 30 is somewhat different from that of the slider body 14A, the ball retainer 30, unlike the conventional ones which are bent at right angles, never interferes with the surfaces of the end caps 14B, and the difference in length between them can be readily absorbed. Thus, the ball retainers 30 can be secured to the slider with ease.

After the ball retainers 30 have been secured to the slider 14 in the above-described manner, the rolling balls 25 are installed in the ball rolling grooves 16, the ball returning paths 17 and the curved paths 18 of the slider 14. In the case of the above-described second conventional retainer, the ball retainers are secured to the slider with the side seals 35 mounted on the outer surfaces of the end caps 14 before the balls are installed in the slider. On the other hand, in the embodiment of the present invention, the side seals are not used for securing the ball retainers to the slider; that is, before the side seals are attached to the outer surfaces of the end caps, the rolling balls 25 can be installed in the ball rolling grooves 16, the ball returning paths 17 and the curved paths 18 of the slider. That is, the ball installing operation can be achieved quickly as much.

The rolling balls 15 installed in each of the ball rolling grooves 16 are positively held by the linear part 31 of the ball retainer 30; that is, they never fall away from the ball rolling groove 16.

The slider 14 installing the balls 25 is assembled to the guide rail 11. In this operation, the linear parts 31 of the ball retainers 30 are received in the escaping grooves 13 formed in the bottoms of the ball rolling grooves 12 of the guide rail 11, thus not interfering with the guide rail 11.

Thereafter, the assembly of the guide rail 11 and the slider 14 is tested for operating condition by moving the slider 14 on the guide rail 11. The test can quickly be performed without the side seals 35 before the end caps 14B attaches the side seals 35. Finally, the side seals are attached to the end caps 14B, thus, the aimed linear guide apparatus has been manufactured.

The above-described linear guide apparatus has one pair of endless ball circulating paths which are arranged axially symmetrical on both sides; however, the present invention is not limited thereto or thereby. That is, the technical concept of the present invention may be applied to a linear guide apparatus having more than one pair of endless ball circulating paths.

As described above, the ball retainer according to the present invention is made of a wire material which is formed in a circular shape in section. The ball retainer provides the linear part which is fitted in the escaping groove formed in the bottom of the ball rolling groove of the guide rail, and the locking parts which are extended from both ends of the linear part and curved arcuately. And, the pair of outer peripheral grooves are formed in the outer surface of each of the end caps jointed to both ends of the slider in such a manner that their bottoms are curved outwardly. One pair of protrusions are extended from both side walls of each of the outer peripheral grooves towards each other to decrease the groove width. The locking parts of the ball retainer are engaged with the outer peripheral grooves and clamped with the protrusions, so that the ball retainer is fixedly secured to the slider. As was described above, the ball retainers are each made of the wire material circular in section. Hence, in securing the ball retainers to the slider, it is unnecessary to take its directivity into consideration. This means that the ball retainer can be handled with ease.

The locking parts of each of the ball retainer are curved arcuately, and engaged with the outer peripheral grooves formed in the outer surfaces of the end caps. Hence, the ball retainers never interfere with the side seals attached to the end caps. In addition, each of the ball retainers is able to absorb a dimensional difference between itself and the slider body. This means that the ball retainers can be readily secured to the slider.

Moreover, each of the outer peripheral grooves formed in the outer surfaces of the end caps has the pair of protrusions extended from its both side walls towards each other to decrease the groove width. The ball retainer is secured with its locking parts clamped with the protrusions of the outer peripheral grooves. Hence, it is unnecessary to hold the ball retainers with the side seals; that is, the ball retainers are held secured to the slider without the side seals. Hence, before the side seals are attached to the end caps, the balls can be installed in the slider, the slider can be tested for operating condition, and other work essential for the manufacture of a linear guide apparatus can be achieved with high efficiency.

What is claimed is:

1. A linear guide apparatus comprising:

a guide rail including a first ball rolling groove which extends axially in a side surface of the guide rail, the first ball rolling groove having in its bottom an escaping groove which extends axially;

a slider mounted over the guide rail, the slider being axially movable with respect to the guide rail, and including in an inner surface of the slider a second ball rolling groove which confronts the first ball rolling groove and a ball returning path which has a through hole in a wing of the slider, the through hole extending in parallel with the second ball rolling groove;

an end cap joined to an end face of the slider, the end cap including in its inner junction surface a half-ring-shaped curved path which communicates the ball returning path with the second ball rolling groove, the first ball rolling groove and the second ball rolling groove comprising a loaded-ball rolling path which forms an endless ball rolling path with the ball returning path and the curved path;

a plurality of balls installed in the endless ball rolling path; and a ball retainer secured to the slider to prevent the balls from falling away from the slider, the ball retainer being made of a wire material which is formed in a circular shape in section, and comprising a linear part fitted in the escaping groove, and a locking part which extends from an end of the linear part and is curved arcuately, wherein the end cap includes in its outer surface an outer peripheral groove which is curved arcuately, the ball retainer being secured to the slider with the locking part engaged with the outer peripheral groove.

2. The linear guide apparatus of claim 1, wherein the outer peripheral groove is curved in correspondence to the curved path.

3. The linear guide apparatus of claim 1, wherein the outer peripheral groove includes a side wall and protrusions which extend from the side wall so as to decrease the width of the outer peripheral groove.

4. The linear guide apparatus of claim 3, wherein the ball retainer is held between the protrusions.

5. The linear guide apparatus of claim 1, wherein the locking part is so curved that the linear part merges smoothly with the locking part.

* * * * *